May 23, 1933.    P. E. TARLTON    1,910,720
WELL SURVEYING DEVICE
Filed Feb. 11, 1930    3 Sheets-Sheet 1

INVENTOR:
PERLE E. TARLTON,
BY
ATTORNEY.

May 23, 1933.    P. E. TARLTON    1,910,720
WELL SURVEYING DEVICE
Filed Feb. 11, 1930    3 Sheets-Sheet 2

INVENTOR:
PERLE E. TARLTON,
BY
ATTORNEY.

May 23, 1933.  P. E. TARLTON  1,910,720
WELL SURVEYING DEVICE
Filed Feb. 11, 1930   3 Sheets-Sheet 3
Fig.8.
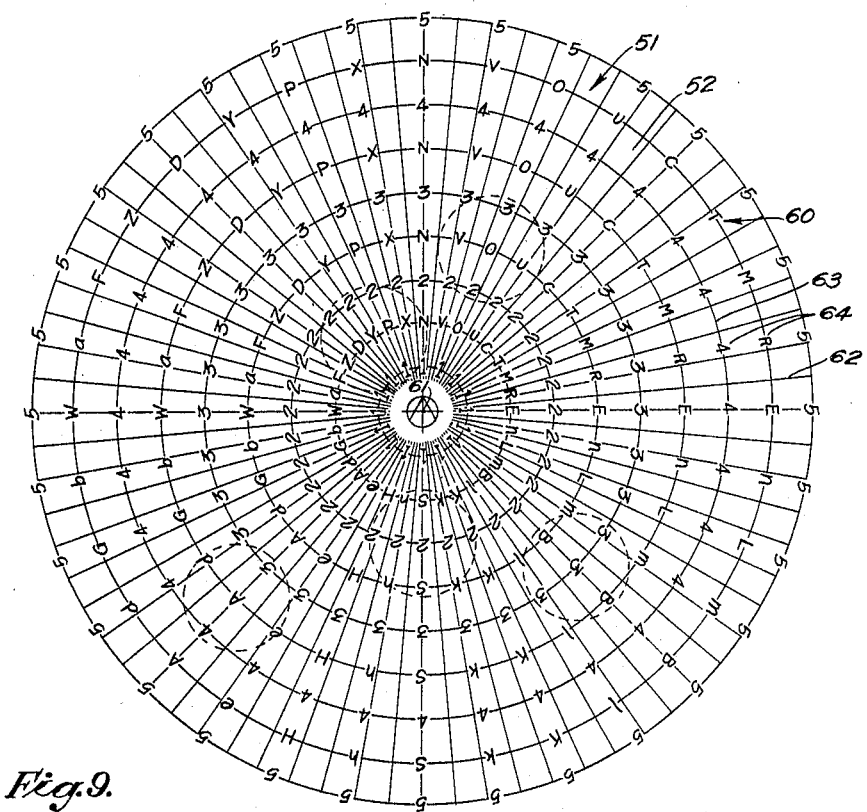
Fig.9.
| Character | Location |
|---|---|
| ⊙ | Perpendicular or Center |
| 1 | 5° OFF PERP. |
| 2 | 15° " " |
| 3 | 25° " " |
| 4 | 35° " " |
| 5 | 45° " " |
| N | NORTH |
| X | 11¼° WEST OF NORTH |
| P | 22½° " " |
| Y | 33¾° " " |
| NO. OF FT. OFF PER 100 FT. DEPTH | | | | |
|---|---|---|---|---|
| 1° | = 2.22 FT OFF PER 100 FT | | | |
| 2° | = | | | |
| 3° | = | | | |
| 4° | = | | | |
| 5° | = 11⅜ " " " " |
| 10° | = 22.22 " " " " |
| 45° | = 100 " " " " |
Fig.10.
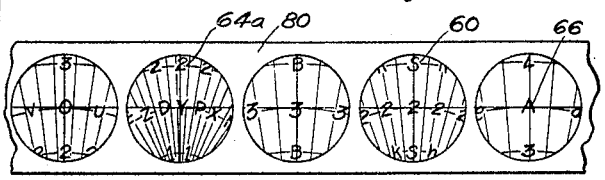
INVENTOR:
PERLE E. TARLTON,
BY
ATTORNEY.

Patented May 23, 1933

1,910,720

UNITED STATES PATENT OFFICE

PERLE E. TARLTON, OF LOS ANGELES, CALIFORNIA

WELL SURVEYING DEVICE

Application filed February 11, 1930. Serial No. 427,565.

My invention relates to a device for determining the inclination to the vertical of a well at a number of points therein so that a survey of the well may be produced.

Numerous surveying devices have been produced for accomplishing this. Such devices usually record a reading at one or more points in the well so that when the surveying device is withdrawn from the well, the inclination of the well at the points may be calculated from the recorded readings.

It is an object of my invention to provide a surveying device of this character in which the inclination may be readily and accurately determined without the necessity for calculation.

The apparatus for accomplishing this end includes a shell which may be lowered inside the well where it is held parallel to the walls thereof. Enclosed by the shell is an indicating device which is maintained at a known azimuth and a known inclination by suitable means. The inclination device thus forms a reference member from which readings may be taken to indicate the azimuth and inclination of the shell and hence, the amount and direction of inclination of the walls of the well. Enclosed also by the shell is a recording device for recording the indications given by the indicating device so that the inclination of the well may be determined after the surveying device is withdrawn from the well.

Another object of my invention is to provide a well surveying device of the above class in which the inclination of the shell is obtained from the indicated azimuth and inclination of a reference point in the shell, which reference point is preferably opposite a zero position of the indicating device when the shell is vertical.

A further object is to provide a well surveying device in which the azimuth and inclination of the reference point are given by suitable intelligence marks placed on the indicating device, the particular mark or marks adjacent the reference point giving the azimuth and inclination of the reference point.

It is also an object to provide a well surveying device in which the reference point is maintained in close proximity to the marks at all times so that an accurate indication may be obtained. I prefer to secure this end by placing the marks on a semi-spherical surface of the indicating device, which surface is concentric with a pivot point of the indicating device.

Another object is to provide a novel indicating device for use in a well surveying device.

A further object is to provide a well surveying device in which the indication given by the indicating device is photographically recorded.

It is another object to provide a novel means for supporting and advancing a light-sensitive member, said means including an endless belt upon which the mentioned light-sensitive member is supported.

It is also an object to provide a well surveying device in which successive indications of the indicating means may be recorded by an advancing light-sensitive member.

Another object is to provide a well surveying device in which the light-sensitive member is advanced by the weight of a movable part of the surveying apparatus.

It is also an object to provide a well surveying device in which the indicating means is illuminated by suitable illuminating means operated by the weight of the surveying apparatus.

It is still another object to provide a device in which means is employed for maintaining an indicating member at a known inclination and in which magnetic means is employed for maintaining the indicating member at a known azimuth.

Further objects will be made evident from the following description of a preferred form of my invention.

In the drawings:

Fig. 8 is an elevational view taken as indicated by the line 8—8 of Fig. 4 showing the arrangement of the intelligence marks on the indicating means.

Fig. 9 is a diagrammatic view of a chart for reading the intelligence marks shown in Fig. 8.

Fig. 10 is an elevational view of a portion of a record taken by the surveying device.

Figure 1:
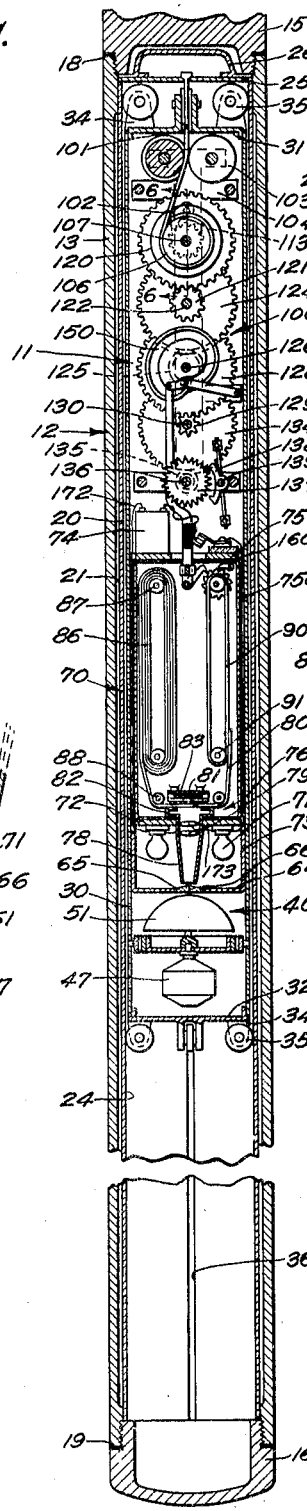
Fig. 1 is a sectional view taken on a longitudinal plane through a surveying device of my invention.
Figure 2:
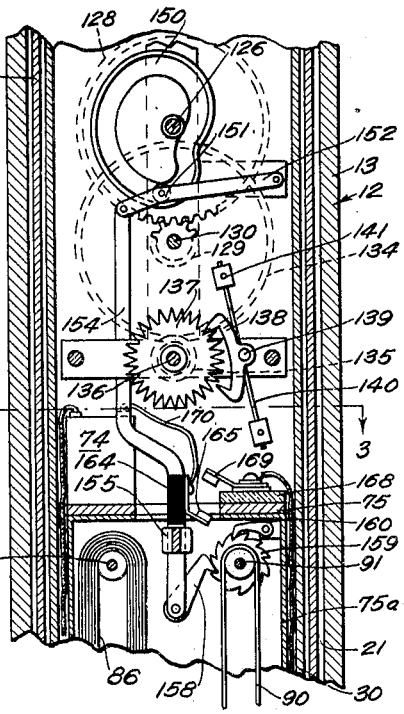
Fig. 2 is a sectional view taken the same as Fig. 1 but on a somewhat enlarged scale, showing a film advancing means of my invention in an advanced position.
Figure 7:
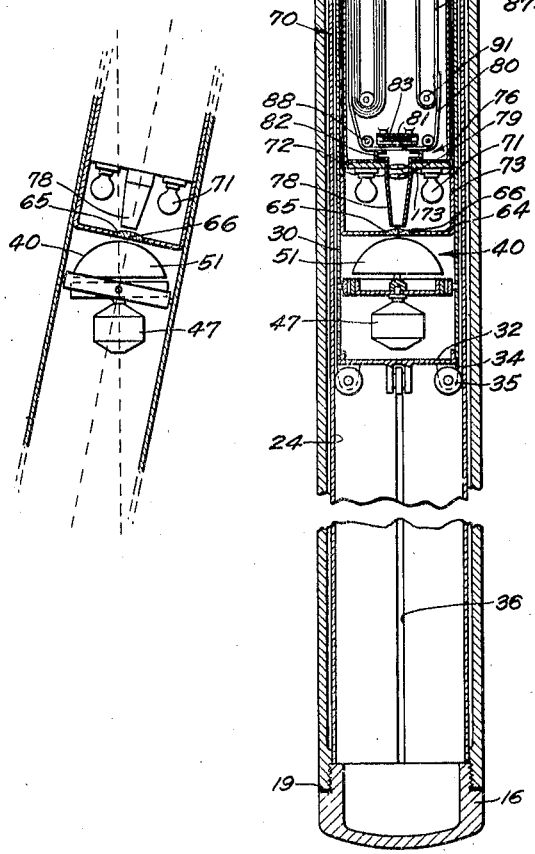
Fig. 7 is a partly sectioned view showing the position assumed by the indicating means when the surveying device is inclined.
Figure 3:
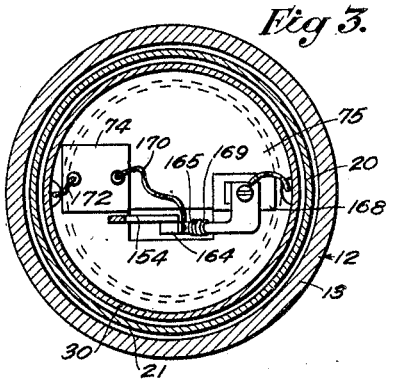
Fig. 3 is a sectional view taken on the line 3—3 of Fig. 2.

Referring particularly to Fig. 1, I show a surveying device 11 of my invention enclosed in a housing 12 which may be lowered inside a well where it assumes a position parallel to the walls thereof in a well known manner. The housing 12 includes an outer cylindrical housing member 13, to the upper and lower ends of which are threadedly attached caps 15 and 16. The upper cap 15 has the upper end thereof formed in any suitable manner to permit attachment to a suitable string of drill pipe (not shown). Positioned between shoulders of the threaded joints between the caps 15 and 16 and the outer housing member 13 are cylindrical packing members 18 and 19 which seal the threaded joints and prevent entrance of moisture inside the housing 12.

Inside the outer housing member 12 is an inner housing member 20 which is held in place by the upper and lower caps 15 and 16. The outer housing member 13 is preferably grooved out on the inner surface thereof adjacent the inner housing member 20 so that a dead-air space 21 is formed between the inner and outer housing members 20 and 13. The dead-air space 21 functions as a heat insulation device for insulating from heat a cylindrical chamber 24 provided inside the inner housing member 20. Positioned between the end of the inner housing member 20 and the upper cap 15 is a closure member 25 having a handle 26 by which the closure member 25 may be removed from the housing 12 when the outer housing member 13 is unscrewed from the cap 15.

Slidably positioned inside the cylindrical chamber 24 is the surveying device 11 which includes a shell 30, which is materially shorter than the housing 12 and is provided with upper and lower caps 31 and 32 secured thereto. Rotatably mounted on brackets 34, formed on the upper and lower caps 31 and 32, are guide rollers 35 which engage grooves 36 formed in the inner surface of the inner housing member 20 and provide for guiding the shell 30 as the shell is moved inside the housing 12, and for holding the surveying device 11 orientated with respect to the housing 12.

Figure 4:
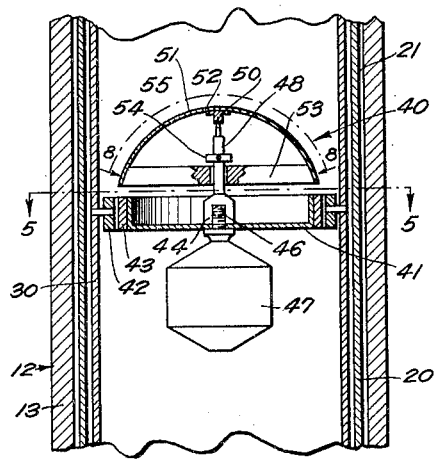
Fig. 4 is a sectional view taken the same as Fig. 1 except on a somewhat enlarged scale showing the construction of an indicating means of my invention.
Figure 5:
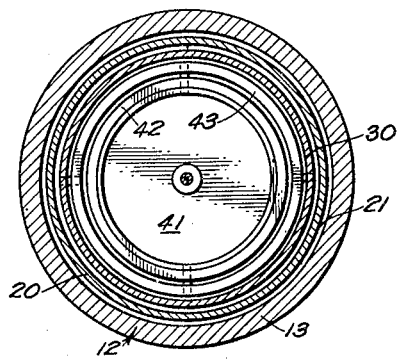
Fig. 5 is a sectional view taken on the line 5—5 of Fig. 4.
Figure 6:
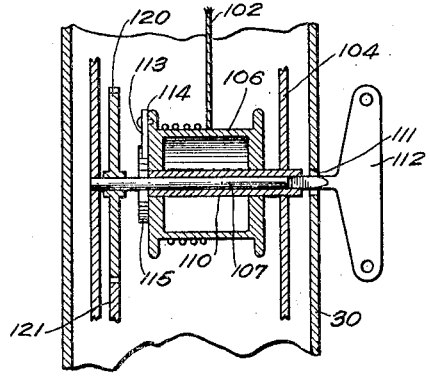
Fig. 6 is a sectional view on a somewhat enlarged scale taken on the line 6—6 of Fig. 1, showing a part of an operating means of my invention.

As best shown in Figs. 4 and 5, positioned in the lower end of the shell 30 is an indicating means 40 which includes a supporting member 41 pivotally supported inside the shell 30 by gimbal rings 42 and 43 so that the supporting member 41 may pivot relative to the shell 30 about two axes intersecting at a pivot point 44. Extending through a central opening in the supporting member 41 is a pin 46 formed on a weight 47, which pin is threaded in a pivot 48 positioned on the opposite side of the supporting member 41 from the weight 47. The weight 47 preferably has its center of gravity directly opposite the center of the supporting member 41 so that the weight 47 acts as a pendulum to maintain the supporting member 41 in a horizontal position at all times.

The upper end of the pivot 48 is pointed so as to pivot in a jewelled bearing cup 50 secured on the inside of an indicating member 51 having a semi-spherical outer surface 52 concentric with the pivot point 44. Secured diametrically across the lower side of the indicating member 51 is a bar magnet 53 through a central opening in which the pivot 48 passes. Secured to the pivot 48 immediately above the bar magnet 52 is a collar 54, which is spaced a small distance therefrom to prevent the indicating member 51 from becoming accidentally detached from the pivot 48.

It will be noted that the indicating member 51 is thus maintained by the weight 47 in a vertical position at all times or at a known inclination to the vertical, the inclination being zero in this case. The indicating member 51 is also maintained by the bar magnet 53 so that it always assumes a north and south position, and is thus maintained at a known azimuth. The indicating member 51 is thus maintained in a fixed position relative to the earth at all times and thus functions as a reference member from which indications may be taken to determine the azimuth and inclination of the shell 30.

As best shown in Fig. 8, a plurality of intelligence marks 60 are placed on the semi-spherical surface 52 of the indicating member 51. These intelligence marks 60 include a plurality of letters and figures. The letters are arranged in a series of radial rows radiating at equal angles from the center 61, and the figures are arranged in a series of circles concentric with the center 61 and at equal angular distances therefrom. Additional radial lines and concentric circles may be placed on the semi-spherical surface 52, if desired, to permit closer reading of the indications. The intelligence marks 60 thus form a system of polar coordinates for determing the azimuth and inclination to the vertical of any point.

The above intelligence marks 60 are made use of in my invention by providing, as shown in Fig. 1, a partition 64 removably secured in the shell 30 above the indicating means 40. Positioned in a central opening in the partition 64 is a transparent window 65 in the form of a lens or magnifying glass. On the window 65 are cross hairs, the intersection of which forms a reference point 66. The reference point 66 is thus maintained in a fixed position relative to the shell 30 and is preferably so positioned that it is adjacent the center 61 of the intelligence marks 60 when the shell 30 is vertical.

In order to determine the azimuth and inclination of the reference point 66 relative to the indicating member 51, it is only necessary for the operator to view through the transparent window 65 the one or more of the intelligence marks 60 which are positioned adjacent the reference point 66. By knowing the angular displacements which are indicated by the polar coordinates formed by the intelligence marks 60, the operator may then determine the azimuth and inclination of the reference point 66 relative to the indicating member 51. Since the indicating member 51 is maintained at a known azimuth and known inclination, which azimuth is zero with reference to the north and south meridian, and which inclination is zero with respect to the vertical, the azimuth and inclination of the reference point 66 as given by the indicating means 40 is the true azimuth and true inclination of this reference point 66. Since the reference point 66 is maintained in a fixed position relative to the shell 30, the azimuth and inclination of the reference point 66 is also the azimuth and inclination of the shell 30.

In order to facilitate reading of the intelligence marks 60, I have provided a chart as shown in Fig. 9, by means of which it is possible to quickly and accurately obtain the azimuth and inclination of the shell 30 from the mark or marks adjacent the transparent window 65.

In order to record the indication given by the indicating means 40 so that the azimuth and inclination of the shell may be obtained after the surveying device 11 is brought to the surface of the well, I provide a recording means 70 which is positioned in the shell 30 above the indicating means 40. The recording means 70 includes illuminating means or lamps 71 which are supported on a partition 72 secured by a cylindrical member 73 to the partition 64 so that the lamps 71 illuminate through the transparent window 65 the intelligence marks 60 which are adjacent the reference point 66. The electric current necessary to light the lamps 71 is obtained from a battery 74 positioned on a partition 75 secured by a cylindrical member 75a to the partition 72. The lamps 71 are connected to the battery 74 by suitable conductors in a manner to be more fully explained later. Supported by the partition 72 is a camera 76 which includes an opaque member 78 in the form of a truncated cone, which opaque member 78 extends through a central opening in the partition 72 and to a position near the transparent window 65. Secured in the opaque member 78 are lenses 79 which focus an image of the indicating member 51 adjacent the reference point 66 on a film 80 positioned in front of an opening 81 in a box member 82 of the camera 76. The film 80 is maintained in contact with the box member 82 by suitable spring means 83 secured to the cylindrical member 75a.

The film 80 is preferably in the form of a strip so that a series of pictures may be recorded thereon, and is preferably initially wound on an endless belt 86 carried by a pair of rollers 87 secured to the cylindrical member 75a. As the film 80 is unwound from the endless belt 86, it is guided by guide rolls 88 so as to pass in front of the opening 81 in the camera 76 and is then wound on an endless belt 90 carried by a similar pair of rollers 91 secured to the cylindrical member 75a. In order to take a series of pictures of the indications given by the indicating means 40, the lamps 71 are supplied with current, in a manner to be more fully explained later, so that they illuminate the indicating member 51. An image of the intelligence marks 60 adjacent the reference point 66 is then focused on the film 80 by the lenses 79 and photographically recorded on the film 80. Current is then withdrawn from the lamps 71 and another portion of the film 80 is then advanced, in a manner to be more fully explained later, in position in front of the opening 81. The operation is then repeated.

In order to supply current to the lamps 71 and advance the film 80, I provide a suitable gear and cam means 100 which is operated by the weight of the surveying device 11. Secured to the closure member 25 and threaded through an opening 101 in the cap 31 is a flexible cable 102 which is guided by a pair of guide rolls 103 rotatably supported on a frame 104 secured to the partition 75. The end of the flexible cable 102 is wound on a drum 106 rotatably supported on a primary shaft 107 journaled by the frame 104.

Formed in the drum 106 is a sleeve 110 which is rotatable opposite an opening 111 in the shell 30 and is provided with a square opening into which a winding key 112 may be inserted for winding the cable 102 on the drum 106. The rotation of the drum 106, produced by the unwinding of the cable 102 therefrom, is transmitted to the shaft 107 by means of a pawl and ratchet device 113 commonly used in clocks. The pawl and ratchet device 113 includes a pawl 114 pivoted to the drum 106 and resiliently engaging a ratchet wheel 115 secured to the primary shaft 107. It will be noted that the surveying device 11 is supported inside the houing 12 by means of the flexible cable 102 which is wound around the drum 106. The weight of the surveying device 11 therefore functions to unwind the cable 102 from the drum 106 so as to rotate the primary shaft 107 when the surveying device 11 is supported inside the housing 12.

Secured to the primary shaft 107 is a primary gear wheel 120 which meshes with a primary pinion 121 secured to a secondary shaft 122 journaled by the frame 104. Secured to the secondary shaft 122 is a secondary gear 124 which meshes with a secondary pinion 125 secured to a tertiary shaft 126. Secured to the tertiary shaft 126 is a tertiary gear 128 which meshes with a tertiary pinion 129 secured to a quaternary shaft 130 journaled by the frame 104. Secured to the quaternary shaft 130 is a quaternary gear 134 which meshes with a quaternary pinion 135 secured to an escapement shaft 136 journaled by the frame 104. Secured to the escapement shaft 136 is an escapement wheel 137 which is engaged by a pallet 138 pivoted on a shaft 139 secured to the frame 104. Secured to the pallet 138 are extending arms 140 which carry weights 141 at the ends thereof.

It will be noted that the gear means which has just been described is rotated by the weight of the surveying device 11 and that the speed of rotation thereof is limited by the escapement device provided by the escapement wheel 137, pallet 138 and weights 141. The flexible cable 102 is thus unwound from the drum 106 at a constant rate, and as it is unwound, the surveying device 11 is lowered inside the housing 12, the surveying device 11 being guided at this time by the guide rolls 35.

The rotation of the gear means is used to control the supply of current to the lamps 71 and to advance the film 80 in a manner to be now described. Secured to the tertiary shaft 126 is a cam 150 which is engaged by a roller 151 rotatably supported on an arm 152 pivoted to the frame 104. Pivoted to the free end of the arm 152 is a link 154 which extends downward inside the shell 30 through an opening in the partition 75 and is slidably supported by a guide 155 secured to the cylindrical member 75a. Pivoted to the lower end of the link 154 is a pawl 158 which engages a ratchet wheel 159 secured to one of the rollers 91. The surface of the cam 150 is made such that as it is rotated by the tertiary shaft 126, an upward and downward movement is imparted to the link 154. The upward and downward movement of the link 154 causes the pawl 158 to engage successive teeth on the ratchet wheel 159 and advance the film 80 in successive steps. A reverse movement of the ratchet wheel 159 is prevented by a pawl 160 pivoted to the cylindrical member 75a.

The upward and downward movement of the link 154 is utilized to complete a circuit between the battery 74 and the lamps 71 so that current is supplied to the lamps 71. Secured to the link 154 is an insulating sleeve 164 to which a movable contact 165 is secured. Secured to the partition 75 is an insulating block 168 which carries a stationary contact 169, the stationary contact 169 being so positioned as to be engaged by the movable contact 165 when the link 154 is at the upper limit of its travel. The movable contact 165 is connected by a flexible conductor 170 to one terminal of the battery 74, the other terminal of the battery 74 being connected by a conductor 172 to both of the lamps 71. Connected to the opposite terminals of the lamps 71 is a conductor 173 connected to the stationary contact 169. The lamps 71 are thus connected in parallel with each other and in series with the battery 74 so that when the movable and stationary contacts 165 and 169 are in engagement, a circuit is established therebetween and the battery 74 supplies current to the lamps 71.

It should be noted that the length of stroke of the link 154 should be such that when the link 154 is in the upper position, a small amount of space is left between the pawl 158 and the teeth on the ratchet wheel 159, as is clearly shown in Fig. 1. This permits a small amount of downward movement of the link 154 before the pawl 158 engages the teeth on the ratchet wheel 159 so as to advance the film 80. During this small amount of movement, the contacts 165 and 169 are maintained in engagement and this provides the necessary amount of time for illuminating the indicating means 40 so that the camera 76 may record the indication given thereby. The movable and stationary contacts 165 and 169 should also be so positioned that contact therebetween is interrupted before the pawl 158 engages the teeth on the ratchet wheel 159 and advancement of the film 80 begins. With this arrangement, no movement of the film 80 will occur while the lamps 71 are illuminating the indicating means 40.

In the operation of my device, the cap 15 of the housing 12 is secured to the lower end of a string of drill pipe in any well known manner so that the housing 12 and surveying device 11 may be lowered inside the well. Before the housing 12 is threaded on the cap 15, the recording means 70 and the gear and cam means 100 are withdrawn from the shell 30 by pulling on the frame 104. This permits a fresh strip of film 80 to be wound around the endless belt 86, threaded around the guide rolls 88, introduced between the spring means 83 and the camera 76 and secured to the endless belt 90. The recording means 70 and the gear and cam means 100 are then replaced in the shell 30 and the flexible cable 102 is wound on the drum 106 by means of the key 112, in a manner already described. The surveying device 11 is then lowered inside the housing 12 by means of the handle 26 on the closure member 25. The housing 12 is then screwed on to the cap 15 and the device lowered inside the well. Due to the weight of the surveying device 11 being supported by the flexible cable 102, operation of the gear and cam means 100 is started as soon as the surveying device 11 is positioned inside the housing 12. Operation of the gear and cam means 100 is maintained at a steady rate due to the escapement device, and pictures are therefore taken on the film 80, in a manner already described, at a uniform rate. It is therefore possible, by knowing the rate of operation of the gear and cam means 100, to know at what rate pictures are recorded on the film 80. The indicating device 11 and housing 12 are therefore preferably lowered inside the well at such a rate that the pictures will be recorded on the film 80 at points in the well at which it is desired to record the inclination.

When the indicating device 11 is lowered inside a well having a steel casing, the magnetic means is not effective in maintaining a fixed azimuth, and the indicating device is then maintained at a fixed azimuth by holding the string of drill pipe at a fixed azimuth in a manner well known in the art. The indicating device is maintained at a fixed azimuth relative to the drill pipe by the rollers 35 engaging the grooves 36.

The pictures recorded by the camera 76 on the film 80 will include one or more of the intelligence marks 60 which are positioned opposite the reference point 66, this being already fully described. As the surveying device 11 and housing 12 are therefore lowered inside the well and are caused to assume various inclinations such as shown in Fig. 8, due to the inclination of the walls of the well, the pictures recorded on the film 80 will include such reference marks as will enable the operator to thereafter determine the amount and direction of the inclination of the walls of the well at the points at which pictures were taken.

It is usually preferable that the amount of the film 80 wound on the endless belt 86 and the rate of advancement of the film 80 should be such that the required number of pictures are taken before the surveying device reaches its lower limit of travel in the housing 12. When the bottom of the well is reached, the surveying device 11 should have reached a lower position inside the housing 12, at which position operation of the gear and cam means 100 will have been stopped. The surveying device 11 and housing 12 are then withdrawn from the well in a manner well known in the art, and the housing 12 unscrewed from the cap 15. The surveying device 11 may then be withdrawn from the housing 12 by lifting on the handle 26. The recording means 70 is withdrawn from the shell 30 so that the film 80 may then be withdrawn from the recording means 70 and developed so as to bring out the pictures recorded thereon.

In some cases it might be desirable that the indicating device 11 record readings as it is being withdrawn from the well. In this case, the amount of time between successive pictures is made longer so that the surveying device may be lowered to the bottom of the well and withdrawn the required amount before the operation of the device is stopped. In any event, the timing should be such that the device may be completely lowered to the bottom of the well before operation is stopped.

As shown in Fig. 8, the intelligence marks 60 on the indicating member 51 assume the form of a chart in which meridian lines 62 are shown as radiating from the zero point 61 and spaced 5° apart. These meridians 62 represent the azimuth with reference to the north and south meridian. Parallel lines 63 are also shown relatively spaced to represent 5° of inclination with respect to the vertical. At the intersections of at least some of the meridians 62 and the parallels 63 are intelligence marks 64.

In Fig. 10 is shown a chart in which is given the definition of each intelligence mark appearing upon the indicating member 51.

It will be readily understood from an inspection of Figs. 8, 9 and 10 that an operator, upon reading a picture such as the picture 64a of the developed film 80 shown in Fig. 10, may, by comparing the intelligence marks appearing in this picture with the chart shown in Fig. 9, determine that the well slanted 10° from the vertical, in a direction 33¾° west of north, at the particular depth at which the picture 64a was taken.

Figure 11:
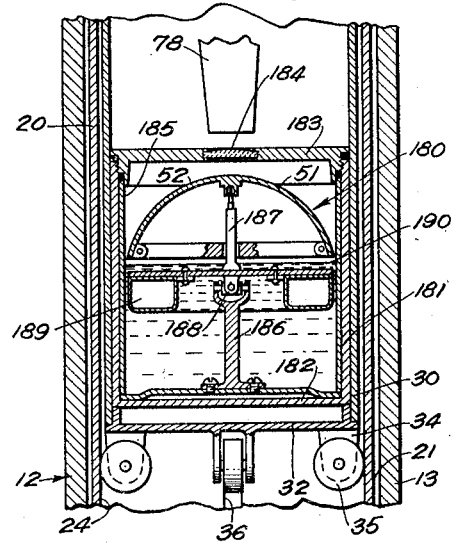
Fig. 11 is a sectional view taken the same as Fig. 4, showing an alternative form of indicating means.

In Fig. 11, I have shown an alternative form of indicating means 180, which includes an outer shell 181 having a closed bottom 182, and having a threaded top covering 183, in the center of which is a transparent window 184 similar to the window 65, Fig. 1. An inner cup-shaped member 185 is provided within the outer shell 181 and is retained therein by the cover 183. Rigidly secured to the bottom of the inner member 185 is a vertical post 186, the upper end of which provides a universal connection with a pivot 187, as shown at 188. Supported at the lower end of the pivot 187 above the universal joint 188, is a float 189. The pivot 187 supports an indicating member 51, identical with the indicating member 51 described in connection with Fig. 1. The inner cup-shaped member 185 is adapted to retain a body of liquid, indicated at 190, the purpose of which is to cause the float 189, pivoting on the universal joint 188, to seek a position corresponding to the level of the body of liquid 190 when the shell 181 is tipped at an angle with respect to the vertical, thus maintaining the indicating member 51 in a known position at all times, and thus functioning as a reference member in a manner identical to that previously described in connection with the preferred form of my invention.

It should be understood that although I have shown only one complete embodiment of my invention, I am aware that various modifications might be made therein without departing from the spirit of my invention. For example, I have shown only one system of intelligence marks which I have found satisfactory in the operation of my invention, but my invention comprehends the use of any system by means of which the azimuth and inclination of a point may be determined. I am furthermore not limited to the use of a camera for recording the inclinations given by the indicating means, as various other recording means might be employed.

I prefer to use the weight of the movable portion of my surveying device for rotating the gear and cam means of the invention, but other means might be employed and various other modifications might be made, without exceeding the scope of my invention.

I claim as my invention:

In a well surveying device, the combination of: a shell adapted to be located in said well; indicating means carried by said shell and maintained at a known azimuth and a known inclination, said indicating means being operable to indicate the azimuth and inclination of a reference point in said shell; illuminating means for illuminating said indicating means; camera means for photographically recording the indication given by said indicating means; gear means operated by the weight of said surveying device; and cam means operated by said gear means to operate said illuminating means and said camera means.

In testimony whereof, I have hereunto set my hand at Los Angeles, California, this 6th day of February, 1930.

PERLE E. TARLTON.